F. S. WASHBURN.
ELECTRIC FURNACE FOR PRODUCING OXIDS OF PHOSPHORUS FROM NATURAL PHOSPHATES.
APPLICATION FILED JUNE 17, 1912.
1,044,957.
Patented Nov. 19, 1912.
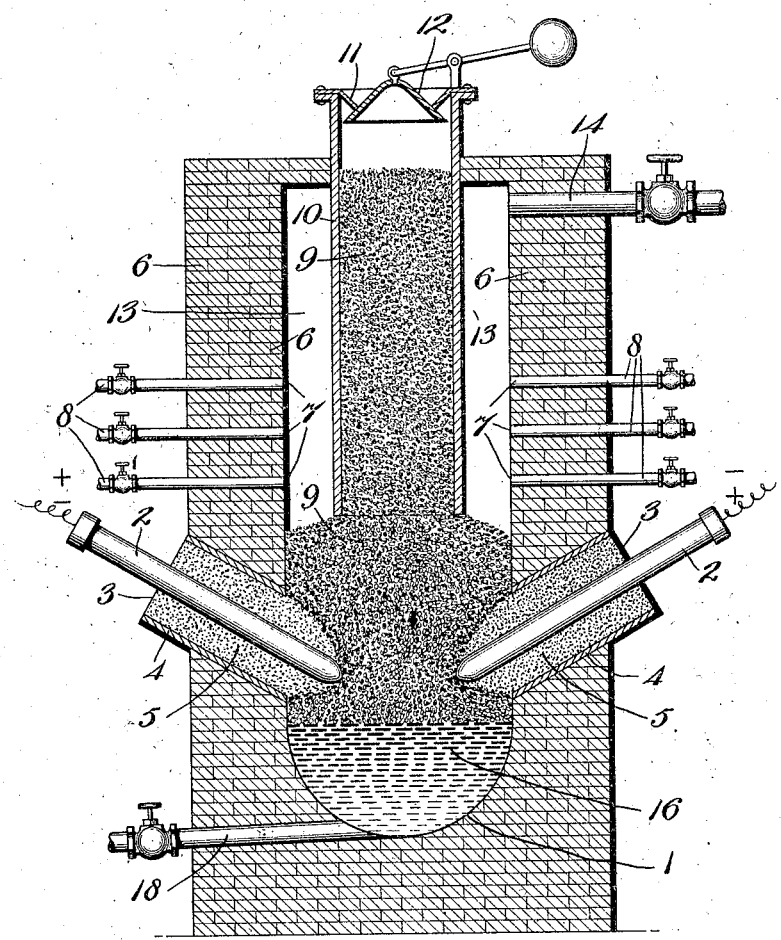

UNITED STATES PATENT OFFICE.

FRANK S. WASHBURN, OF NASHVILLE, TENNESSEE.

ELECTRIC FURNACE FOR PRODUCING OXIDS OF PHOSPHORUS FROM NATURAL PHOSPHATES.

1,044,957.  Specification of Letters Patent.  Patented Nov. 19, 1912.

Application filed June 17, 1912. Serial No. 704,170.

*To all whom it may concern:*

Be it known that I, FRANK S. WASHBURN, a citizen of the United States, residing at Nashville, in the county of Davidson and State of Tennessee, have invented certain new and useful Improvements in Electric Furnaces for Producing Oxids of Phosphorus from Natural Phosphates; and I do hereby declare the following to be a full, clear, and exact description of the invention, such as will enable others skilled in the art to which it appertains to make and use the same.

This invention relates to an electric furnace especially adapted for separating the phosphorus contained in natural phosphates from the mineral, and has for its object to produce an apparatus which will separate this phosphorus in a gaseous form, more quickly and less expensively than the devices heretofore proposed.

To these ends the invention consists in the novel details of construction and combination of parts more fully hereinafter disclosed and particularly pointed out in the claims.

Referring to the accompanying drawings forming a part of this specification in which the figure is a vertical sectional view of an apparatus built in accordance with my invention,—1 indicates the hearth of my furnace which may be made of any suitable refractory material, and 2 the electrodes projecting through the openings 3 which are larger than the said electrodes. Preferably lining the openings 3 are the tubes 4 made of any suitable material, and in the said tubes 4 is preferably placed granular coke 5, or other form of carbon in order to save the consumption of the electrodes 3. This coke or carbon is sufficiently packed in the tubes 4, to prevent any wasteful escape of gases. In the walls 6 of the furnace I provide a plurality of openings 7 for the admission of air to the phosphorus gases given off, in order that the phosphorus may be oxidized to the pentoxid form before it escapes from the furnace. The said openings 7 may, if desired, further be provided with valve controlled pipes 8, in order that the amount of air admitted may be regulated, and therefore the degree of oxidation of the phosphorus controlled.

A charge 9 preferably composed of granular coke, silica and mineral phosphate is introduced to the furnace through the tube 10, which in turn is controlled by the hopper 11 and the bell-shaped valve 12, as shown. The tube 10 extends below the lowest opening 7 as indicated, so that the charge contained therein will not be subjected to the action of the air entering the opening 7. An annular space 13 is left between the tube 10 and the walls of the furnace, and a valved pipe 14 for drawing off the liberated gases communicates with said space, as shown.

In order that the exact principles involved in this furnace may be clearly understood, and further, in order that these principles may be the more easily differentiated from the prior art, the following well known chemical principles are stated, as well as the details of certain large scale tests that have been carried on by myself. It is well known that an acid may be displaced from a salt combination by another less volatile acid. For example, hydrochloric and nitric acids have long since been made from their naturally occurring combinations by displacement with the less volatile sulfuric acid, the hydrochloric and nitric acids being boiled off from the mixture and condensed in suitable towers. On these same chemical grounds it should therefore be possible to decompose a natural phosphate by an acid less volatile than phosphoric acid. In such case, the cheapest and most easily obtainable less volatile acid is silicic, found in the form of the anhydrid, $SiO_2$, which does not volatilize much under 1800° C. in its pure state, and at even higher temperatures in combination with a strong base. Accordingly, large scale experiments were made to determine if silica would in fact displace phosphoric acid from its combinations at a temperature above the volatilization point of the phosphorus pentoxid, and it was found that if a mineral phosphate, for example the tricalcium phosphate $Ca_3P_2O_8$, is mixed without carbon with silica as a flux, and subjected to the temperature of an ordinary furnace phosphorus pentoxid $P_2O_5$, will be evolved in small amounts, but never amounting to more than a few per cent. of the total phosphorous contained in the mixture, even if the heating is sufficient to produce fusion. It was further found that if such a mixture be heated to fusion in an ordinary furnace in the presence of carbon, a larger yield of phosphorus will be had. Some of this phosphorus was found to be in the form of vapor, while other portions were in the form of a mixture of various oxids of phosphorus. But, after a long series of large scale and expensive tests with various types of furnaces, other than electric furnaces, was had, it became apparent that it was not possible to separate a sufficient quantity of the phosphorus contained in the mixture, to render the process commercially successful. The cause of this is not at present fully understood, for the addition of carbon to the phosphate undoubtedly weakens the bonds by which the phosphate is bound, and as the mixture can be fused in such furnaces, the phosphorus should be freely evolved when it is not. Upon employing a furnace of the type illustrated, however, as much as 90% of the contained phosphorus is immediately driven off, probably due to the accelerated action of the carbon in loosening the bonds of the phosphorus at the higher temperatures available, and also probably due to the greater fluidity of the molten bath 16 at such temperatures. Whatever may be the real cause, such a furnace, in fact, supplies a means by which a commercial process can be carried out.

The operation of my furnace is as follows:—The charge of finely divided phosphate, silica and coke, preferably chemically proportioned with the carbon slightly in excess, is continuously fed down the tube 10, and the current is turned on. The molten material collects on the hearth 1, and may be drawn out of the tap hole 18 from time to time. As above stated, substantially all of the phosphorus contained in the mixture is quickly evolved, and the gases pass up through the charge above the fusion zone, and become mixed with the air admitted through the openings 7. The phosphorus in said gases thereupon becomes readily oxidized to the pentoxid form $P_2O_5$, while the heat thus liberated passes through the walls of the tube 10 and serves to preheat the descending charge. The oxidized phosphorus with the other gases is withdrawn by way of the tube 14 to a suitable apparatus, not shown, which separates out the phosphorus bearing gases, in the manner well known. It will be observed that the air admitted through the openings 7 to oxidize the phosphorus does not pass through the charge containing carbon in the tube 10, and therefore no loss is experienced through the oxidation of said carbon, which would otherwise occur. It will be further observed, should it be desired to otherwise utilize the heat liberated by the oxidation of the phosphorus, that the tube 10 may be made sufficiently thick to prevent any substantial transmission of said heat to its contained charge, and in that case the heat may be carried out of the furnace either by the hot gases or by other means. It will be further observed that the construction illustrated permits the employment of charges in a fine state of division without necessitating a high gas pressure in the furnace, or on the fusion zone, because the gases must only pass through a comparatively thin layer of the charge material before entering the annular space 13, and they may be continuously drawn off from said space as fast as formed.

What I claim is:—

1. An electric furnace provided with a gas tight chamber; a hearth at the bottom of said chamber; electrodes passing into said chamber provided with a granular carbon packing also entering said chamber; a valved feed tube extending into said chamber and terminating above said hearth; and means entering said chamber above the lower end of said tube for admitting air to said chamber for oxidizing the evolved gases, substantially as described.

2. An electric furnace provided with a gas tight chamber; a hearth at the bottom of said chamber; electrodes passing into said chamber provided with a granular carbon packing also entering said chamber; tubes surrounding said electrodes for holding said packing; a valved feed tube extending into said chamber and terminating above said hearth adapted to deliver a charge of finely divided phosphate rock, silica and carbon to said hearth; means entering said chamber above the lower end of said tube for admitting air to said chamber for oxidizing the evolved gases without igniting the carbon in said tube; and means for continuously withdrawing the oxidized gases from said chamber, substantially as described.

In testimony whereof, I affix my signature, in presence of two witnesses.

FRANK S. WASHBURN.

Witnesses:
H. A. BLACK,
W. D. KIRKPATRICK.